No. 840,157. PATENTED JAN. 1, 1907.
S. OTIS.
WORM GEARING.
APPLICATION FILED MAR. 16, 1906.
2 SHEETS—SHEET 1.
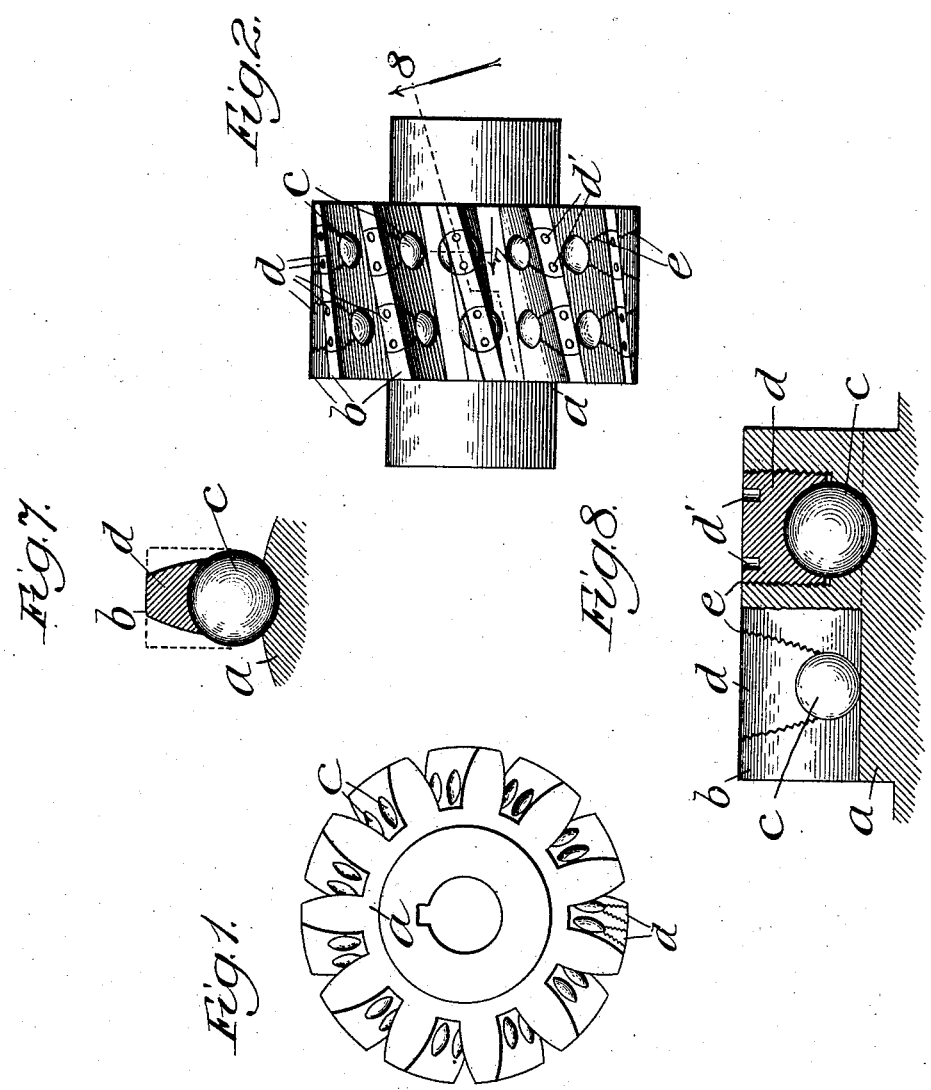

No. 840,157. PATENTED JAN. 1, 1907.
S. OTIS.
WORM GEARING.
APPLICATION FILED MAR. 16, 1906.
2 SHEETS—SHEET 2.
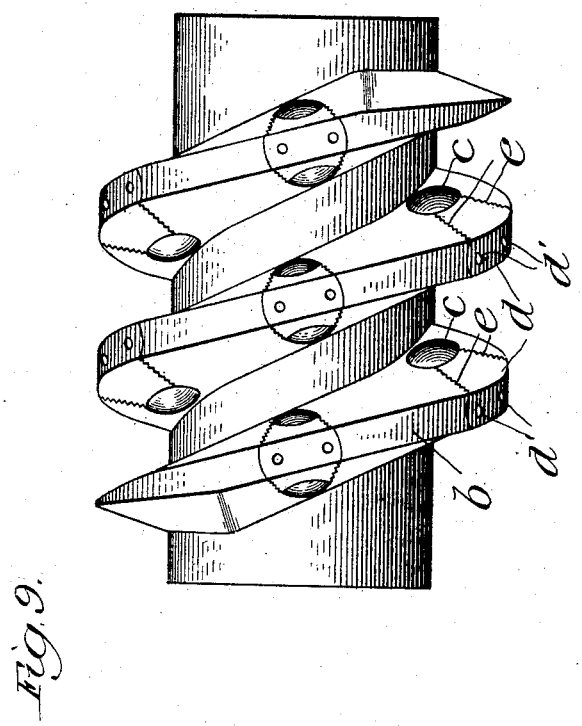
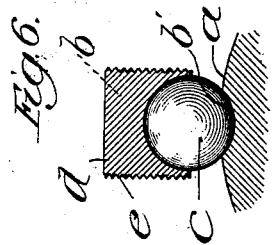
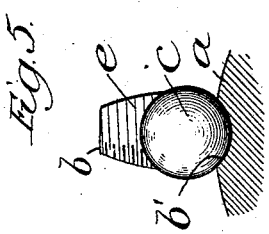
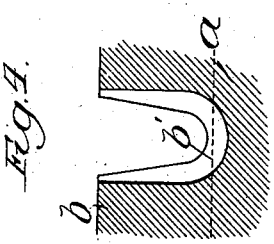
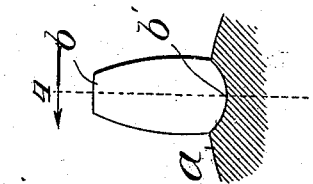
Witnesses:
Chas. E. Gaylord.
John Enders.
Inventor:
Spencer Otis,
By Thomas F. Sheridan,
Atty.

UNITED STATES PATENT OFFICE.

SPENCER OTIS, OF CHICAGO, ILLINOIS, ASSIGNOR TO NATIONAL PATENT HOLDING COMPANY, OF RAPID CITY, SOUTH DAKOTA, A CORPORATION OF SOUTH DAKOTA.

WORM-GEARING.

No. 840,157.      Specification of Letters Patent.      Patented Jan. 1, 1907.

Application filed March 16, 1906. Serial No. 306,399.

*To all whom it may concern:*

Be it known that I, SPENCER OTIS, a citizen of the United States, residing at Chicago, in the county of Cook and State of Illinois, have invented certain new and useful Improvements in Worm-Gearing, of which the following is a specification.

My invention relates to worm-gearing, and has for its object to provide a worm and worm-gear provided with antifriction devices by means of which the friction may be greatly reduced.

The invention consists in the combinations and details hereinafter described and claimed.

In the accompanying drawings, Figure 1 is an end view of a worm gear-wheel having my improvements applied thereto. Fig. 2 is a plan view of the same. Figs. 3, 4, 5, 6, and 7 are detail views, partly in section, showing the process of manufacture of a gear embodying my invention, Fig. 7 being a section on the line 7 of Fig. 2 and Fig. 8 a section on the line 8 of Fig. 2. Fig. 9 is a plan view of a worm having my improvements applied thereto.

As is well-known, the transmission of power and speed by means of a worm and gear entails considerable loss on account of friction. To remove this objection, I provide either the worm or the worm-gear with antifriction devices. Referring to Fig. 1, I show a worm-gear the teeth of which are made solid, as usual. Each tooth is then recessed transversely, as indicated in Figs. 3 and 4, and a socket $b'$ is formed at the bottom of the recessed portion of the tooth for the reception of an antifriction-ball $c$. The sides of the tooth forming the sides of the recess are screw-threaded, as indicated at $e$ in Fig. 5. A screw-threaded plug $d$, having a recessed portion adapted to fit the antifriction-ball, is then screwed into position between the walls of the recess, as shown in Fig. 6. This plug is circular in form and is provided with recesses $d'$ for a spanner-wrench. After being screwed into position the portions of the plug which project laterally on each side of the tooth are cut off, so that the plug will conform to the shape of the tooth and form a portion thereof, leaving the tooth substantially in its original shape, as shown in Figs. 2 and 7.

By this means it will be seen that I provide an antifriction device which is securely held in place, leaving the tooth practically solid, and also that the antifriction device projects laterally on each side of the tooth and forms the bearing-surface thereof. The construction described is exceedingly strong and there is little likelihood of its getting out of order. If desired, the antifriction devices instead of being applied to the gear-tooth may be applied to the worm, as indicated in Fig. 9, the process of manufacture being the same in each case.

I claim—

1. In a worm-gearing, a solid tooth provided with a transverse recess, and an antifriction device mounted in the recess and forming a part of the tooth, said antifriction device projecting laterally on both sides of the tooth to form the bearing-surface of the tooth.

2. In a worm-gearing, a solid roller provided with a transverse recess, and an antifriction-ball filling the recess and forming a part of the tooth and projecting laterally on both sides of the tooth to form the bearing-surface of the tooth.

3. In a worm-gearing, a solid tooth provided with a transverse recess forming a ball-pocket, an antifriction-ball in the pocket, and a recessed plug forming a part of the tooth for retaining the ball in operative position.

4. In a worm-gearing, a solid tooth provided with a screw-threaded transverse recess forming a ball-pocket, an antifriction-ball in the pocket projecting laterally on each side of the tooth to form a bearing-surface thereof, and a screw-threaded plug forming a part of the tooth for retaining the ball in operative position.

5. In a worm-gearing, a worm having transverse recesses extending therethrough, antifriction-balls in the recesses, each ball projecting on each side of the worm, and plugs forming a part of the worm for retaining the balls in operative position.

SPENCER OTIS.

Witnesses:
ANNA L. SAVOIE,
ANNIE C. COURTENAY.